(No Model.) 2 Sheets—Sheet 1.
M. V. SEXTON.
AGRICULTURAL IMPLEMENT.
No. 495,274. Patented Apr. 11, 1893.
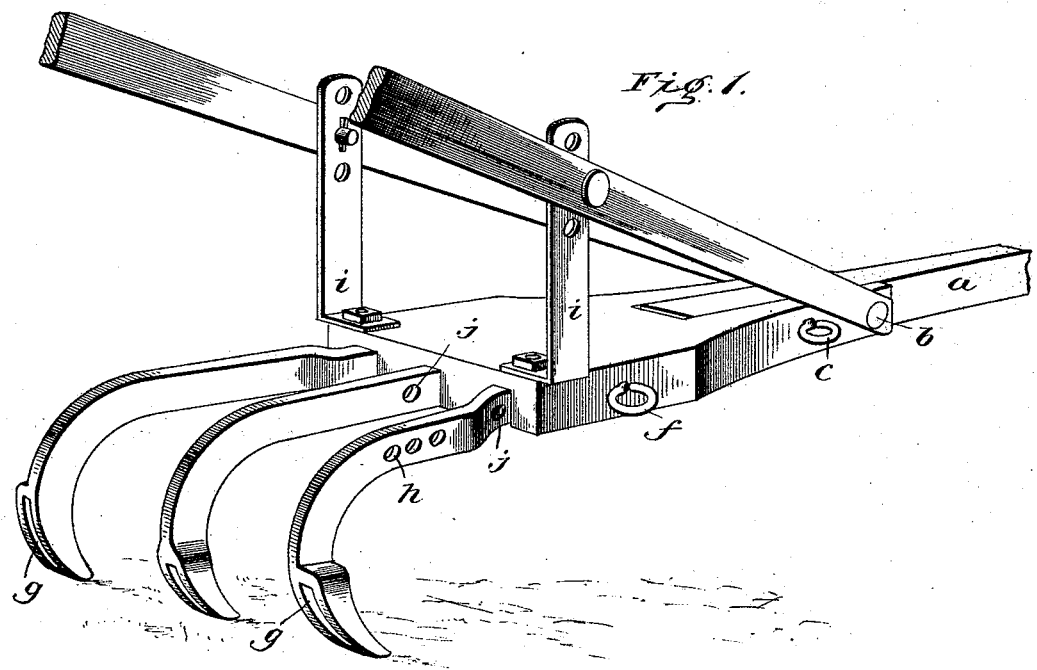
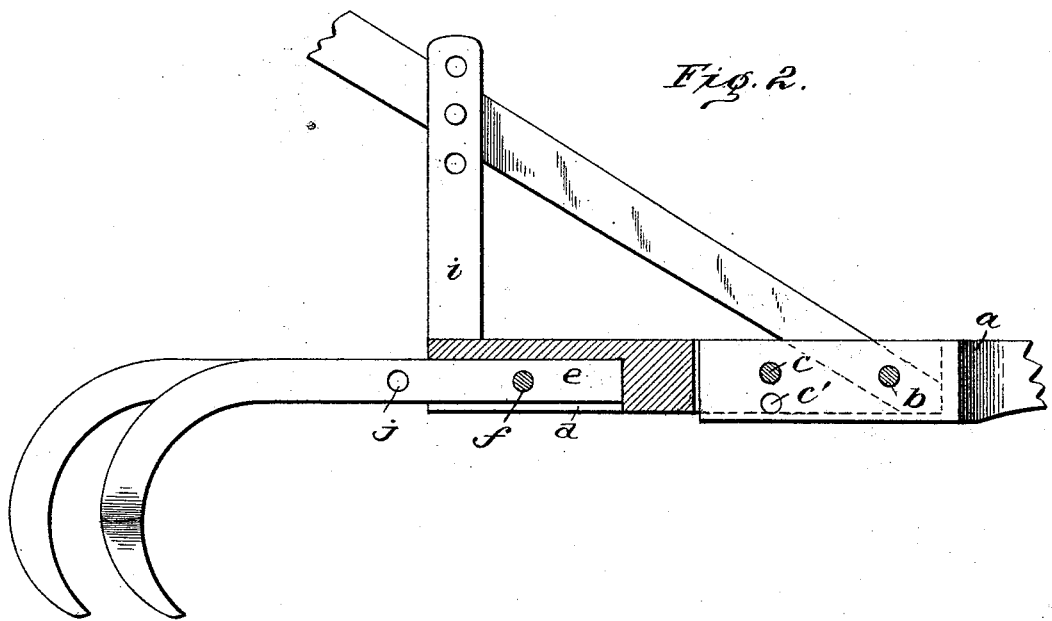
Witnesses
Guy D. Johnson
Woodbury Lowery
Inventor
Martin V. Sexton
By Johnson and Johnson
his Attorneys
THE NORRIS PETERS CO., PHOTO-LITHO., WASHINGTON, D. C.

(No Model.) 2 Sheets—Sheet 2.
M. V. SEXTON.
AGRICULTURAL IMPLEMENT.
No. 495,274. Patented Apr. 11, 1893.
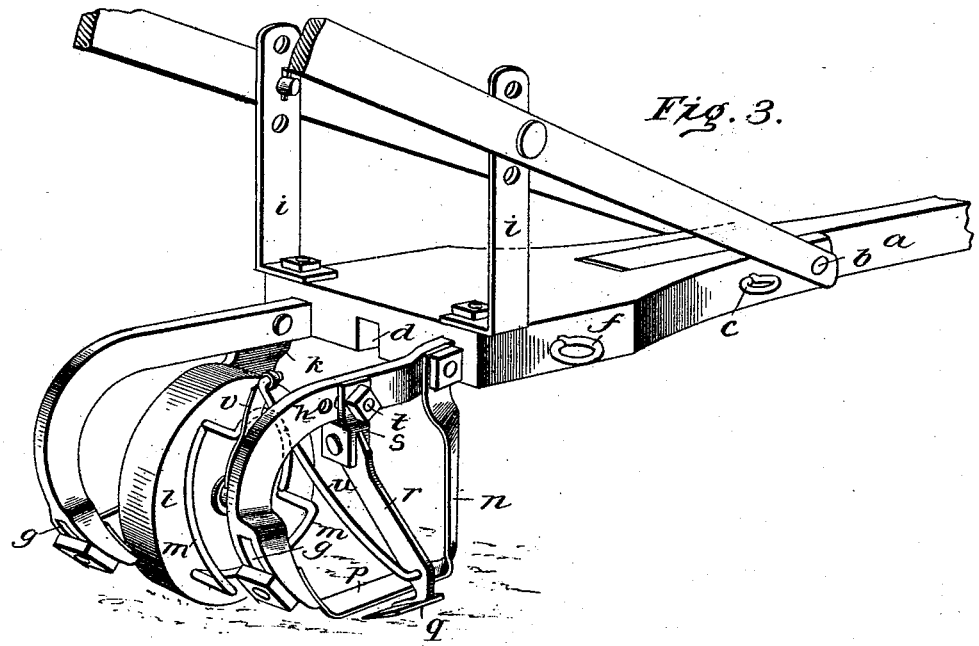
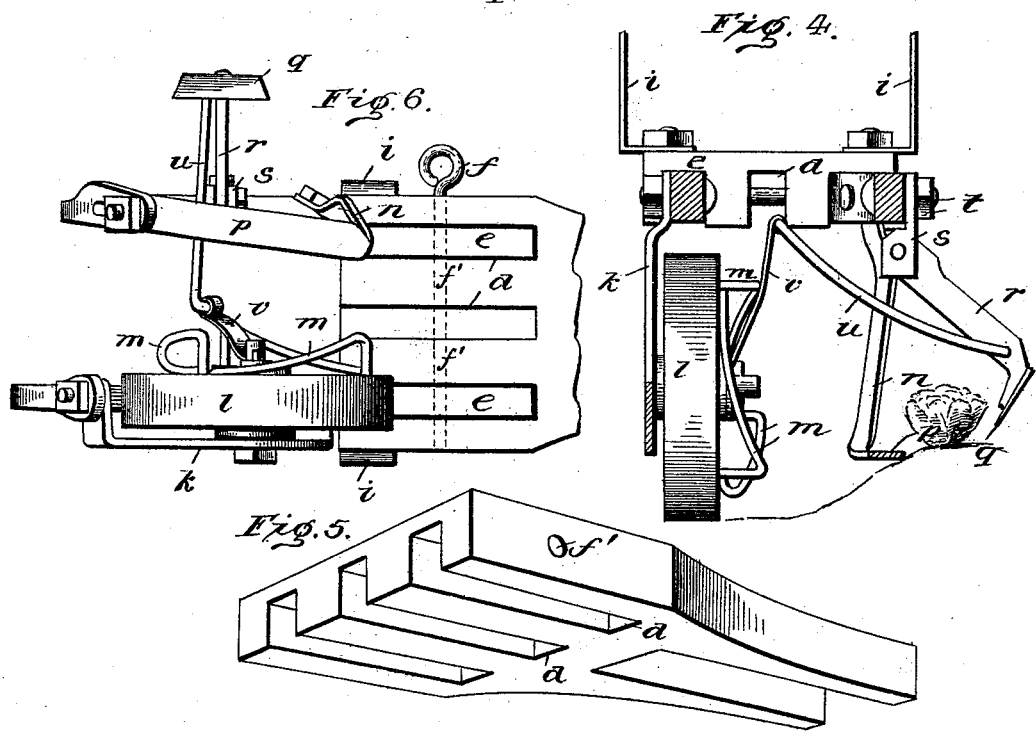
Witnesses
August Johnson
Woodbury Lowery
Inventor
Martin V Sexton
By Johnson & Johnson
his Attorney
THE NORRIS PETERS CO., PHOTO-LITHO., WASHINGTON, D. C.

UNITED STATES PATENT OFFICE.

MARTIN V. SEXTON, OF HACKETT CITY, ARKANSAS.

AGRICULTURAL IMPLEMENT.

SPECIFICATION forming part of Letters Patent No. 495,274, dated April 11, 1893.

Application filed November 11, 1892. Serial No. 451,657. (No model.)

*To all whom it may concern:*

Be it known that I, MARTIN V. SEXTON, a citizen of the United States, and a resident of Hackett City, in the county of Sebastian and State of Arkansas, have invented certain new and useful Improvements in Agricultural Implements, of which the following is a specification.

I have produced an improved implement for agricultural purposes, wherein provision is made for using the implement for tillage and for thinning out cotton plants in the row by a chopping attachment; and my said improvement consists of certain novel parts and combinations of parts, which are particularly pointed out and designated in the claims concluding this specification.

In the accompanying drawings, I have illustrated in Figure 1 in perspective the implement when it is used as a harrow. Fig. 2 is a vertical section of the same. Fig. 3 represents the implement in perspective when it is used as a cotton chopper. Fig. 4 shows a cross section of the same; and Fig. 5 shows an inverted view of the socket-casting for containing the curved beams which form the harrow and are adapted to receive attachments for different kinds of work. Fig. 6 is a bottom view of the socket casting and the chopper attachment.

I use a single casting as a body to which the tongue, the handles, and the curved beams for the acting parts are attached. This casting is bifurcated at its front end to receive the tongue $a$ which is pivoted thereto by the same bolt $b$ which secures the handles. Back of this bolt there is a pin $c$ which passes through the forked end of the body and the tongue which has a series of holes $c'$ to permit the pin to set and hold the tongue at the angle which is best suited for the work to be done. Back of this pin the body is formed with parallel sockets or grooves $d$ open at the under side and at the rear end. The curved beams are made with flat shanks $e$ adapted to fit closely into these socket grooves and they are secured therein by a pin $f$ which passes through holes $f'$ in the walls which form the grooves. These curved beams so fastened extend out behind the grooved casting and terminate in downward curved ends which are formed with slots $g$. This way of confining and fastening the beams permits them to be used singly or together and to be quickly removed and changed as the pin serves to hold the beams up in their socket grooves. These curved beams I prefer to make of unequal length and to use them in a group of three so as to form a side harrow in which the slotted ends of the beams serve as the harrow teeth. These slotted ends also serve to receive various forms of turning plows, shovels and scrapers, as may be desired to suit the work. In connection with these slotted ends I also form holes $h$ in the straight ends of the beams for the attachment of a chopping device used in thinning out cotton plants, so that the same beams which carry the tilling appliances, also serve to carry the cotton thinning appliance, and for this purpose the curved beams are made interchangeable in the socket-casting.

I have not shown any of the various tilling appliances because they are well known as is also the manner of bolting them to the slotted standards and beams. It will, however, be understood that when the implement is used for tilling the middle beam is removed and the two outer beams are provided with suitable turning plows, or shovels or wings for cultivating.

As a scraper I use a straight beam in the middle socket groove. To obtain the proper distance between the beams when all three are used, I make the outer ones bent laterally at their shanks and this also allows the use of a socket-body of less width than would otherwise be required. On this socket-casting are fastened supports $i$ to which the handles are attached and made adjustable to suit the person controlling the implement. As before stated the curved beams standing out from the socket-casting serve as the means for carrying a chopping attachment for thinning out cotton plants in the rows and this attachment I will now describe. In adapting the implement for this work I remove the left side bent beam, and set in its place the middle straight beam. The two side beams standing in place have each a hole $j$ in its straight shank part just outside of the socket casting and these holes in connection with the slot in the foot of each beam serve for attaching by bolts, brackets or hangers, which form elements of the chopping attachment. The hanger $k$ on the left side beam forms the bearing for a ground wheel $l$ which is mounted upon the inner side of said bracket, and has on its inner side a cam of two or more divisions or acting inclines $m$ which are concentric with the axis of the wheel. The hanger or bracket $n$ on the right side beam forms a horizontal runner which consists of a plate $p$ inclining inward and forward from the beam-foot so as to run alongside of the row in a slightly inclined position to it and between it and the wheel and just opposite the latter. To the beam above the runner is hung a hoe-blade $q$, so as swing with a chopping action across the top of the runner, and in conjunction with it constitutes the chopping elements, the hoe-blade acting to clip or sever the plants by a shearing action with the outer edge of the runner. The hoe-blade for this purpose is carried by an arm $r$ pivoted to a short bracket or clip $s$ which is fastened by a bolt $t$ to the beam. A rod or link $u$ pivoted to the hoe end of this arm $r$ extends over toward the wheel and is connected to the upper end of a plate spring $v$ which, crossing the said cams radially, rises above the wheel and has its lower end suitably secured to the inner end of the short axle of the wheel, so that its resilient force constantly tends to throw the hoe inward across the top of the runner which forms the fixed part of the chopper. The wheel-cams act to throw the hoe-blade outward against the force of the spring. The stroke of the hoe is sufficient to throw it away from the runner and beyond the row of plants and to bring it inward against the row of plants over the top of the runner-plate. The clip of the hoe-arm is made adjustable by holes $h$ so as to set the hoe to strike the runner at the proper angle, and, as the runner is placed to run along the side of the row of plants it is supported a little above the surface of the ground. It is also important to notice that while the hoe-arm can be set at an angle leaning toward the front from its pivot end, the runner can be set at an angle to suit the hoe by raising and lowering that end of the runner which is fastened in the slot of the beam-foot. These adjustments I find important to give the desired cutting action to the hoe with the runner so as to strike the plants with an oblique cutting action against the edge of the runner. It will of course be understood that this cutting action or stroke of the hoe is regulated and controlled by the number of cams on the face of the wheel in order to thin out the cotton row the required distances apart for a purpose well understood in the cultivation of cotton.

I prefer to give the cutting stroke to the hoe by a plate spring as described, because the chopping action of the hoe-blade is thereby made to have a sudden movement, but it is obvious that equivalent connections may be made for operating the hoe blade from the ground wheel, so as to give a quick chopping stroke.

It will be understood that the wheel is revolved as the machine is drawn forward and that the spring in passing from each cam, actuates the hoe-blade in successive strokes, and that the extent of such cams regulates the distances at which the bunches of plants are to be chopped from the row.

I make the hoe-blade separate from its pivoted arm, and I connect the latter by a rod having a pivoted connection with the free end of the spring and with the lower end of the hoe carrying arm. This construction gives a direct thrust to the arm at its chopping end, and permits the renewal of the spring and of the hoe-blade. This chopping attachment can be quickly applied and removed from the curved beams.

I claim as my improvement—

1. In a cultivator, the frame consisting of a metal block bifurcated at its front end and grooved at the rear end on its under side, in combination with the plow-beams, their confining pin, the tongue and the handles, all secured to said block as shown and described.

2. The combination, with a body or frame and curved beams fixed to and projecting rearwardly therefrom, of a hanger on one of said beams, at one side of said body, a ground wheel on said hanger having concentric cams, a plate spring carried by said bracket in co-operative relation to said cams, a second hanger on a second beam at the other side of said body and forming a member of the chopper, an arm pivoted to said second beam having a hoe-blade adapted to co-operate with said fixed chopper member, and a rod connecting said hoe-arm with said plate spring, substantially as described.

3. The combination with a body or frame, and a curved beam fixed to and projecting rearwardly therefrom at each side, of a bracket fixed to and depending from the right side beam and having a horizontal runner part, an arm depending from and pivotally connected to said beam and having a hoe-blade co-operating with said runner part to form a cotton chopping device, a ground wheel mounted on the other side beam, and suitable mechanism for connecting said wheel and hoe-carrying arm for operating the latter across the runner, substantially as described.

4. A cotton chopping attachment for agricultural implements consisting of the bracket $k$, a ground wheel mounted thereon having concentric cams, a spring carried by said bracket in co-operative relation to said cams, a second bracket $n$ having a horizontal runner-bar or plate $p$, a hoe-blade and an arm therefor pivoted to operate across said bar or plate, and a rod crossing between said brackets connecting the hoe-arm and the said spring, substantially as described.

5. The combination, with a plow frame, of a beam extending therefrom and having a series of holes $h$ and terminating in a curved slotted foot, a bracket depending therefrom having a horizontal runner bar *p* adjustably fastened in the slot of said beam-foot, a clip *s* adjustable in said holes, a hanging arm *r* pivotally connected to said clip and having a hoe-blade at its lower end, a rod *u* connecting the lower end of said hanging-arm, and suitable means for reciprocating said rod and hoe-blade over the runner bar, substantially as described.

In testimony whereof I have hereunto signed this specification in the presence of witnesses.

MARTIN V. SEXTON.

Witnesses:
A. P. WALKER,
A. J. SCOTT,
L. M. FORBES.